United States Patent
Kluth

[11] Patent Number: 5,804,713
[45] Date of Patent: Sep. 8, 1998

[54] APPARATUS FOR SENSOR INSTALLATIONS IN WELLS

[75] Inventor: Erhard Lothar Kluth, Alresford, United Kingdom

[73] Assignee: Sensor Dynamics Ltd., United Kingdom

[21] Appl. No.: 809,947

[22] PCT Filed: Sep. 20, 1995

[86] PCT No.: PCT/GB95/02233

§ 371 Date: Mar. 19, 1997

§ 102(e) Date: Mar. 19, 1997

[87] PCT Pub. No.: WO96/09461

PCT Pub. Date: Mar. 28, 1996

[30] Foreign Application Priority Data

Sep. 21, 1994 [GB] United Kingdom ............. 9419006

[51] Int. Cl.⁶ .................. E21B 47/01; G01D 5/26; G08C 23/06
[52] U.S. Cl. .................. 73/152.01; 73/152.54; 73/623; 166/250; 166/255; 175/50; 175/78; 175/323
[58] Field of Search ........... 73/152.01, 152.02, 73/152.54, 623; 128/654, 656, 772; 175/50, 78, 323; 166/64, 77, 250, 254, 255

[56] References Cited

U.S. PATENT DOCUMENTS

| 2,301,326 | 11/1942 | Reistle, Jr. ........................ 73/51 |
| 2,824,378 | 2/1958 | Stokes ............................ 73/175 |
| 2,894,200 | 7/1959 | Szasz ............................. 324/10 |
| 3,086,167 | 4/1963 | Chaney et al. .................... 324/1 |
| 4,167,111 | 9/1979 | Spuck, III ........................ 73/155 |
| 4,226,288 | 10/1980 | Collins, Jr. ..................... 175/62 |
| 4,442,842 | 4/1984 | Baba ............................. 128/660 |
| 4,455,869 | 6/1984 | Broussard et al. ................. 73/151 |
| 4,951,677 | 8/1990 | Crowley, et al. ................. 128/662.06 |
| 5,097,838 | 3/1992 | Hirooka et al. ................... 128/662.06 |
| 5,626,192 | 5/1997 | Connell et al. ................... 166/255.1 |

FOREIGN PATENT DOCUMENTS 0 546 892 A1  1/1992  European Pat. Off. .
2 284 257     9/1994  United Kingdom .

Primary Examiner—Hezron E. Williams
Assistant Examiner—J. David Wiggins
Attorney, Agent, or Firm—Iandiorio & Teska

[57] ABSTRACT

Apparatus for the installation of sensors (37) in channels (31), which apparatus comprises a first channel (31) containing at least one sensor location arrangement (35), the first channel (31) and the sensor location arrangement (35) being such that at least one sensor (37) is able to be pumped through the first channel (31) to the sensor location arrangement (35), the sensor location arrangement (35) being provided with at least one turn (3) such that the physical disposition of the sensor (37) after it has been pumped to the sensor location arrangement (35) is not linear, and the turn (3) being such that it comprises a loop of hydraulic conduit.

10 Claims, 5 Drawing Sheets

APPARATUS FOR SENSOR INSTALLATIONS IN WELLS

The invention relates to apparatus for the installation of sensors in channels. The invention is particularly relevant in the oil industry for installing sensors into oil and gas wells.

A wide variety of measurements make it easier to characterise oil and gas reservoirs. These include measurements designed to locate and track fluid fronts within the reservoir and measurements for seismic interrogation of the rock strata within the reservoir.

Seismic measurements are normally undertaken with acoustic sensors which can be towed behind ships in large arrays, or positioned on land. More recent work entails lowering high energy acoustic sources into wells and using geophones positioned below the acoustic source which monitor the acoustic reflections made by the rock strata. Another recent application has made use of seismic arrays laid in trenches on the ocean floor above the reservoir. For existing reservoirs where measurements are made to locate more oil or gas, geophones may be positioned in other wells for cross-well seismic measurements where the transmission of sound from one well to a variety of wells in the surrounding reservoir is measured. A major problem is that oil or gas production must be stopped in order to take these measurements, which is both expensive and can cause damage to the well.

Electric current measurements are also used to characterise the reservoir. In particular electric current measurements between one well and a neighbouring well, or between points along the well and points near the top of the well, gives evidence of interconnection of brine within the reservoir. This is an important measurement but it is also difficult to take, as it has to be taken outside the production tubing through which oil and gas flow up from the reservoir.

Temperature measurements are also used to monitor temperature profiles along oil wells. They are particularly important for determining whether steam or oil is escaping through faults in the rock strata. For this application, the resolution provided by existing optical fibre distributed temperature sensors is not always sufficient.

It would be highly advantageous if sensors could be deployed into oil and gas wells, cheaply, and at a convenient time after the main equipment installation (pipes, valves, etc) had been completed, so that measurements could be obtained without interrupting the production of oil and/or gas. It could also reduce the need for specialist personnel to be present at the time of well completion, when space in the vicinity of the well-head can be very restricted. If apparatus were available to achieve this, the availability of a plentiful and readily obtainable supply of information about fluid fronts and seismic data would dramatically improve the economics of reservoir management. Costs of production would be reduced, while the amount of recoverable oil would increase.

An aim of the present invention is to provide apparatus for the installation of sensors in channels. A further aim is to provide apparatus which will allow sensors to be deployed into oil, and gas wells, both during the completion stages of the wells, or at some convenient time thereafter.

According to the present invention, there is provided apparatus for the installation of sensors in channels, which apparatus comprises first channel means containing at least one sensor location means, the first channel means and the sensor location means being such that at least one sensor is able to be pumped through the first channel means to the sensor location means, the sensor location means being provided with at least one turn such that the physical position of the sensor after it has been pumped to the sensor location means is not linear, and the turn being such that it comprises a loop of hydraulic conduit.

The first channel means may be a length of hydraulic conduit or chemical injection line.

The turn comprising the loop of hydraulic conduit may be either in a plane or in a spiral.

In an embodiment of the present invention, the turn is wrapped around a second channel means.

The second channel means may be production tubing in an oil or gas well through which oil or gas is extracted from a reservoir.

The apparatus may be one in which there are several separate location means, each location means comprising several turns whose spacing is comparable to the diameter of the second channel means. Thus, for example, for seismic sensing applications, there are preferably several location means separated by around five to fifty meters, each location means comprising several (typically three to twenty) turn means whose spacing is comparable to the diameter of the second channel means. Such an apparatus would allow an array of optical fibre acoustic sensors to be pumped down the first channel means until they were located in the location means, with the effective centres of each sensor in the array positioned within a spiral looped channel around the location means. Each acoustic sensor operates as a hydrophone, and each array of hydrophones may be steered electronically in order to detect acoustic signals from desired directions. An alternative approach would be to deploy suitably precoiled hydrophones along, a conduit. This becomes practical when the control line is of suitably larger dimensions as, for example, are found in coiled tubing commonly used in the oil and gas industry. In such an implementation further coils would not be required, and the coiled tubing would not necessarily follow the line of the production tubing. The apparatus as a whole, comprising several hydrophone arrays strung down the first channel means, is an electronically steerable acoustic array capable of gathering data for seismic surveys. The array or arrays can either be installed in or around the second channel means and installed during well completion (ie while completing the installation of equipment into the oil or gas well), or pumped into the first channel means at a convenient time thereafer.

The sensor array can be pumped through the first channel means using a variety of fluids such as water, hydraulic oil, or gas. In a typical application, the sensor array may be designed to resemble an optical fibre cable having a diameter of a round 250 um to 1000 um such that it can be readily pumped through conveniently sized hydraulic control line such as ¼" (6 mm) or ⅜" (10 mm) outer diameter, at a water flow rate of around 0.5 to 3 liters per minute. If larger diameter structures are used, then fluid flow can still be used to effect transport, by employing a technique which is used to extract ¼" (6 mm) control lines from coiled tubing of 2½" (65 mm) diameter. The array can be interrogated using a variety of known techniques.

For electric current sensing applications, fibre optic current sensors may be used. The sensing element may compose one or more loops of optical fibre through which light is passed. Electric current flowing through the cross sectional area enclosed within such loop results in Faraday rotation of the plane of plarization for light passing through the fibre loop which can be measured by suitable instrumentation. Clearly the apparatus described for the seismic sensing application can also be used for taking electric current measurements, each location means measuring the total electric current flowing through the production string at the desired location. The apparatus could be used to take both measurements simultaneously, with the sensors either being pumped down together, or one after the other. The preferred choice of material for the hydraulic conduit used in this application is such that it will not shield the magnetic fields generated by the electric current from the optical fibre inside. The apparatus can be simplified if electric current measurement only is desired, as the need to position the first channel means accurately in relation to the second channel means is less significant.

For temperature profile measurements, the resolution of the profile along an oil well can be increased by wrapping the first channel means around the production tubing. The apparatus described above achieves this aim. The same apparatus can therefore be used for acoustic arrays and/or, electric current monitoring, and/or for increasing the spatial resolution of temperature profile measurements. Alternatively, if temperature profiling through rock strata of interest is required, then the first channel means may be coiled around the production tubing where it penetrates these strata. The fibre sensor for the temperature profiling measurement can be pumped in after well completion.

Embodiments of the invention will now be described solely by way of example and with reference to the accompanying drawings in which.

Figure 1:
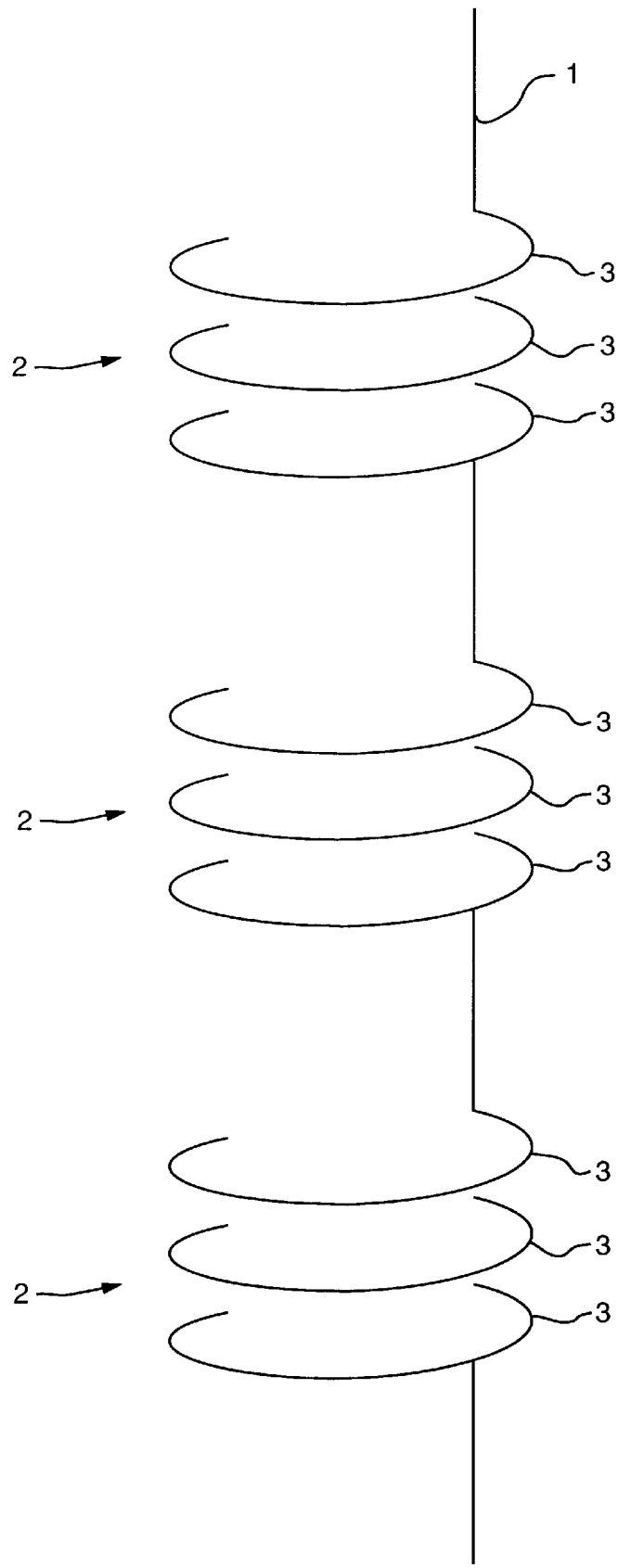
FIG. 1 is a diagram of an embodiment of the present invention showing first channel means.

With reference to FIG. 1, there is provided first channel means 1 comprising one or more location means 2. The location means 2 are fabricated by configuring first channel means 1 into one or more turn means 3.

Figure 2:
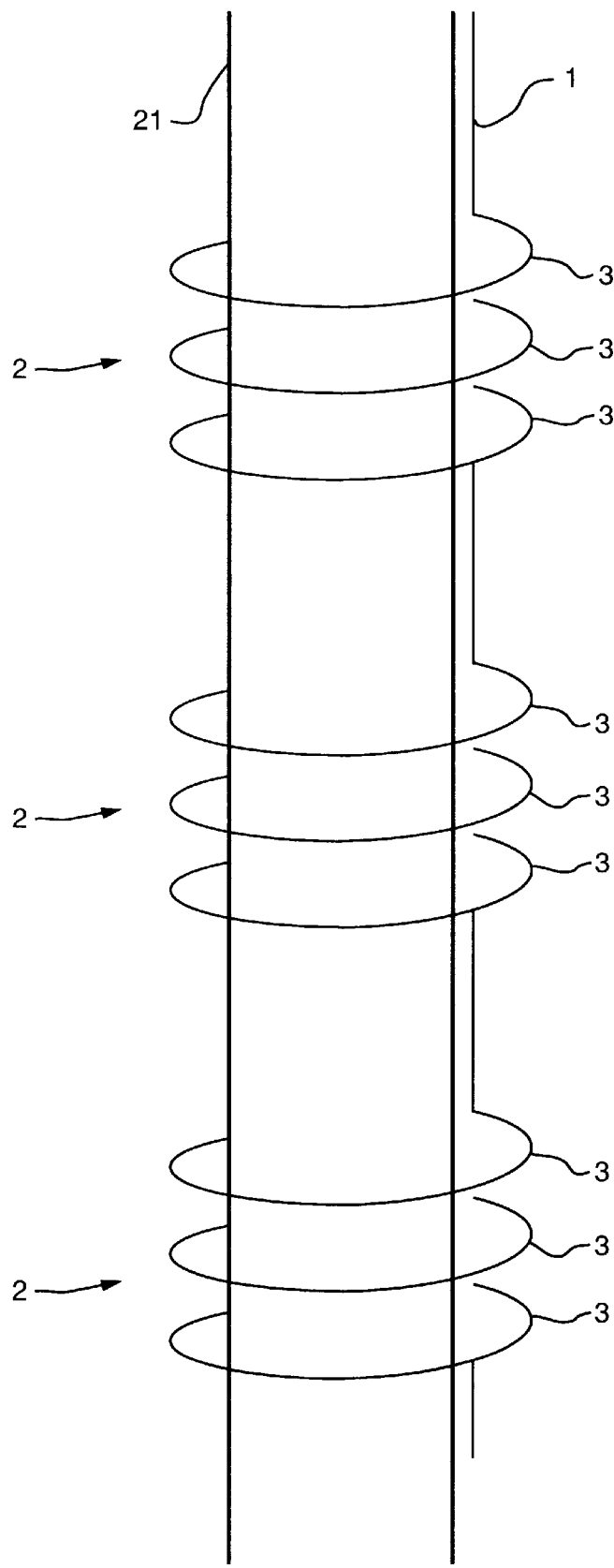
FIG. 2 is a diagram an embodiment of the present invention where first channel means is wrapped around second channel means.

With reference to FIG. 2, first channel means 1 is such that the location means 2 encompasses second channel means 21.

Figure 3:
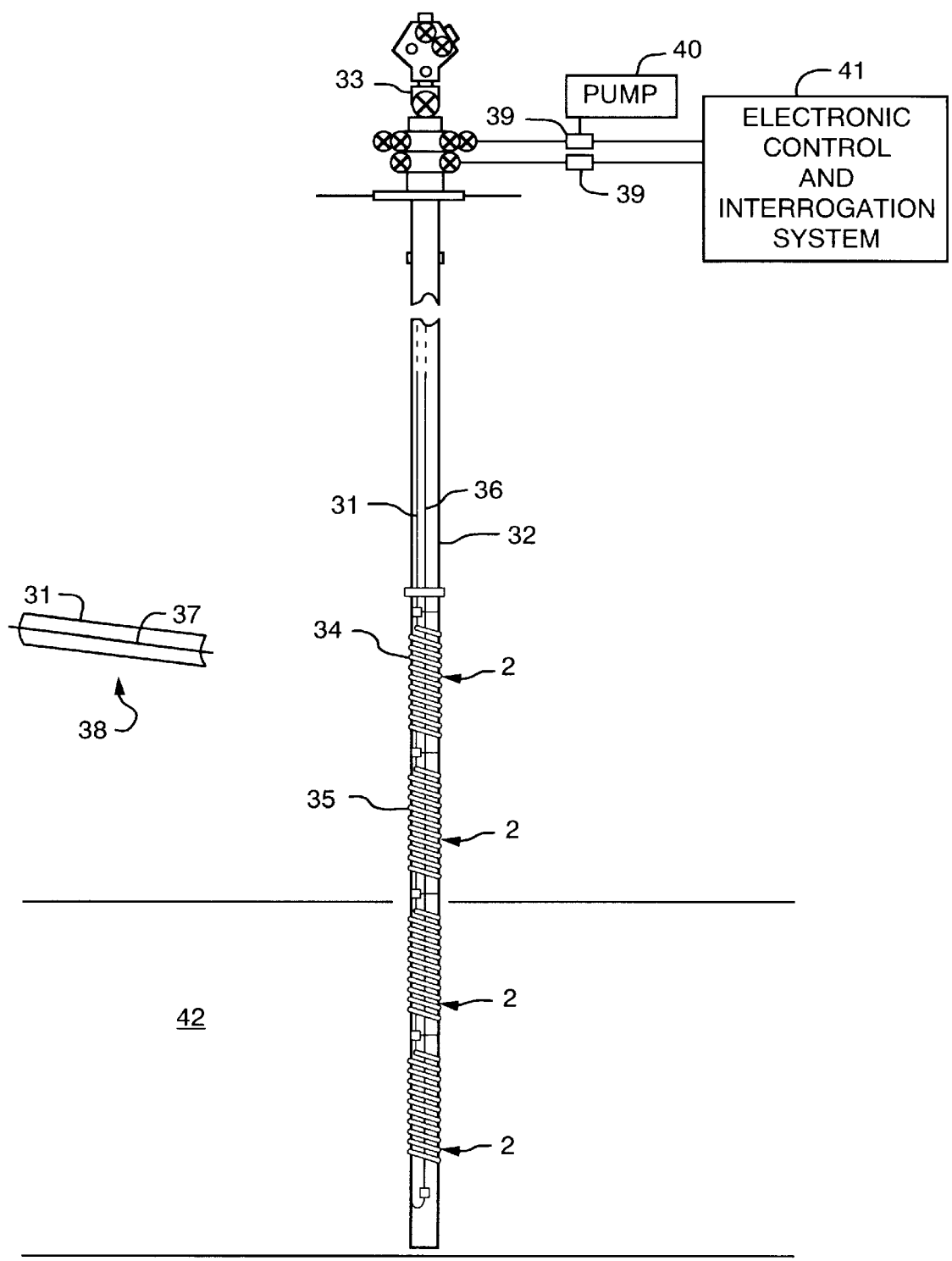
FIG. 3 is a diagram of an embodiment of the present invention showing a typical assembly of the apparatus in an oil or gas well.

FIG. 3 shows hydraulic control line 31 of convenient size (6 mm or 10 mm) attached, for example by straps, to the main production tube 32 of an oil or gas well. The production tube extends down into the reservoir, 42. The control line enters the well via the well-head 33 and may lie linearly along the production tube down to the depth at which the first location means 2 is situated. The control line 31 then spirals around the production tube 31 one or more turns 34. Additional location means 35 all comprising of one, or more, turns of the control line around the production tube, are positioned at intervals further along the production tube. The control line then returns to the surface in a linear fashion 36 along the production tube, where it exits the well via the well-head. Alternatively the return path may follow a similar path to the downward path, or it may return by an altogether different route, for example inside the production tubing 32.

The sensors 37 are positioned within the hydraulic control line, as shown in the detail at 38, having been deployed by pumping a suitable fluid through the line. After deployment, the sensors and their interconnecting cable extend along the length of the control line.

The hydraulic control line is connected, via appropriate high pressure seals 39 and a pump 40, to an electronic control and interrogation system 41 at which measurements are taken.

Figure 4:
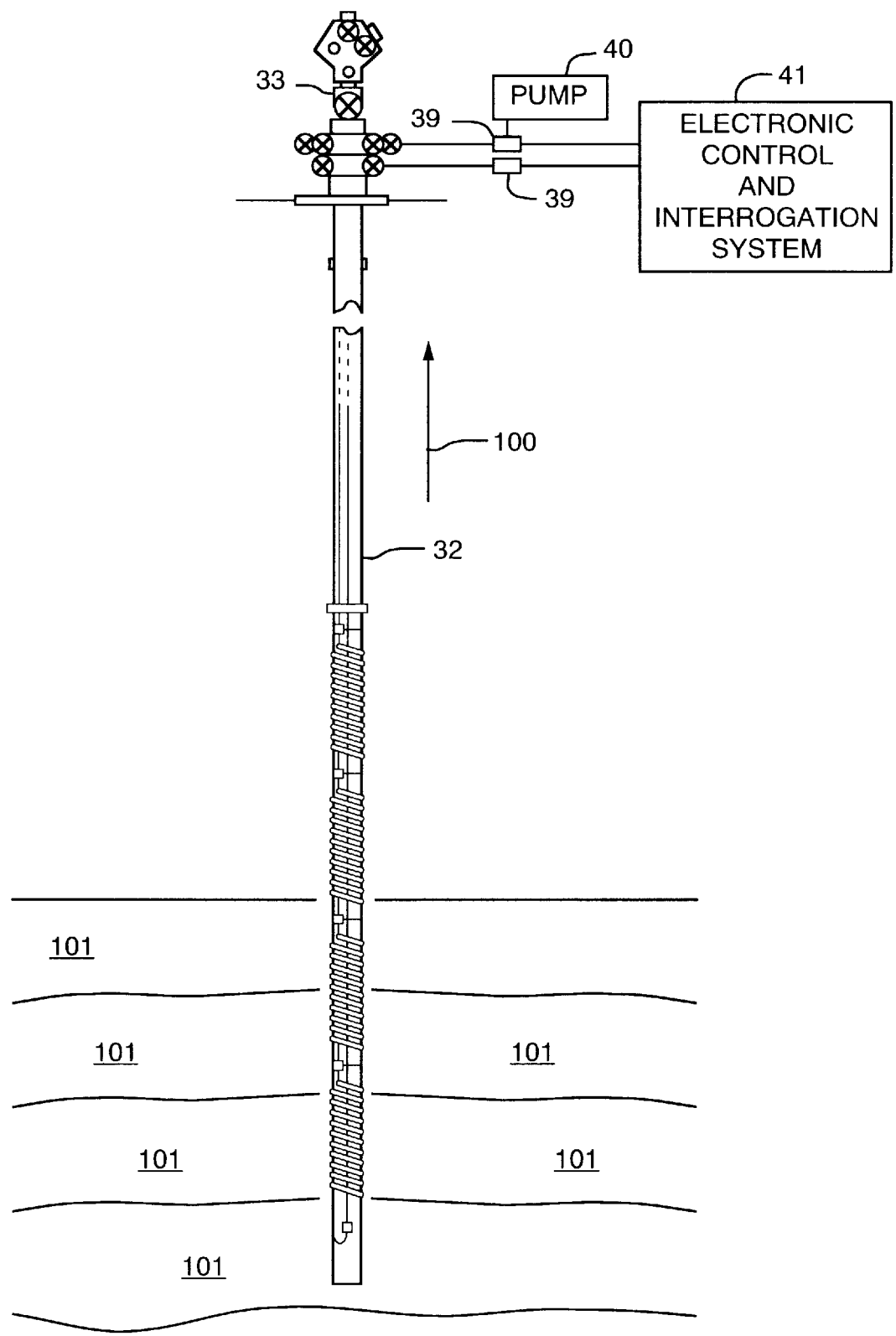
FIG. 4 is a diagram of an embodiment of the present invention configured as an electric current sensor.

With reference to FIG. 4, for electric current-sensing applications, a linear array of optical fibre-current sensors could be used. In each loop of the control line the sensor measures the line integral of the electric current 100 passing up the production tubing 32, thus multiplying the effect by the number of turns wrapped around the production tube. In order to monitor the electric current passing up the production tube from, for example, producing layers within the reservoir which may contain brine, the coiled regions of the control line and their associated current sensors would probably, but not necessarily, be positioned both above and within the brine layer. The electric current passes along the production tube and is detected when the magnetic field, induced by the moving electric charges, interacts with the sensors in the coiled regions of the control line. In this application that involves magnetic field sensitive fibre optic sensors the choice of non-magnetic control line material, such as a non-magnetic stainless steel, may be important.

Figure 5:
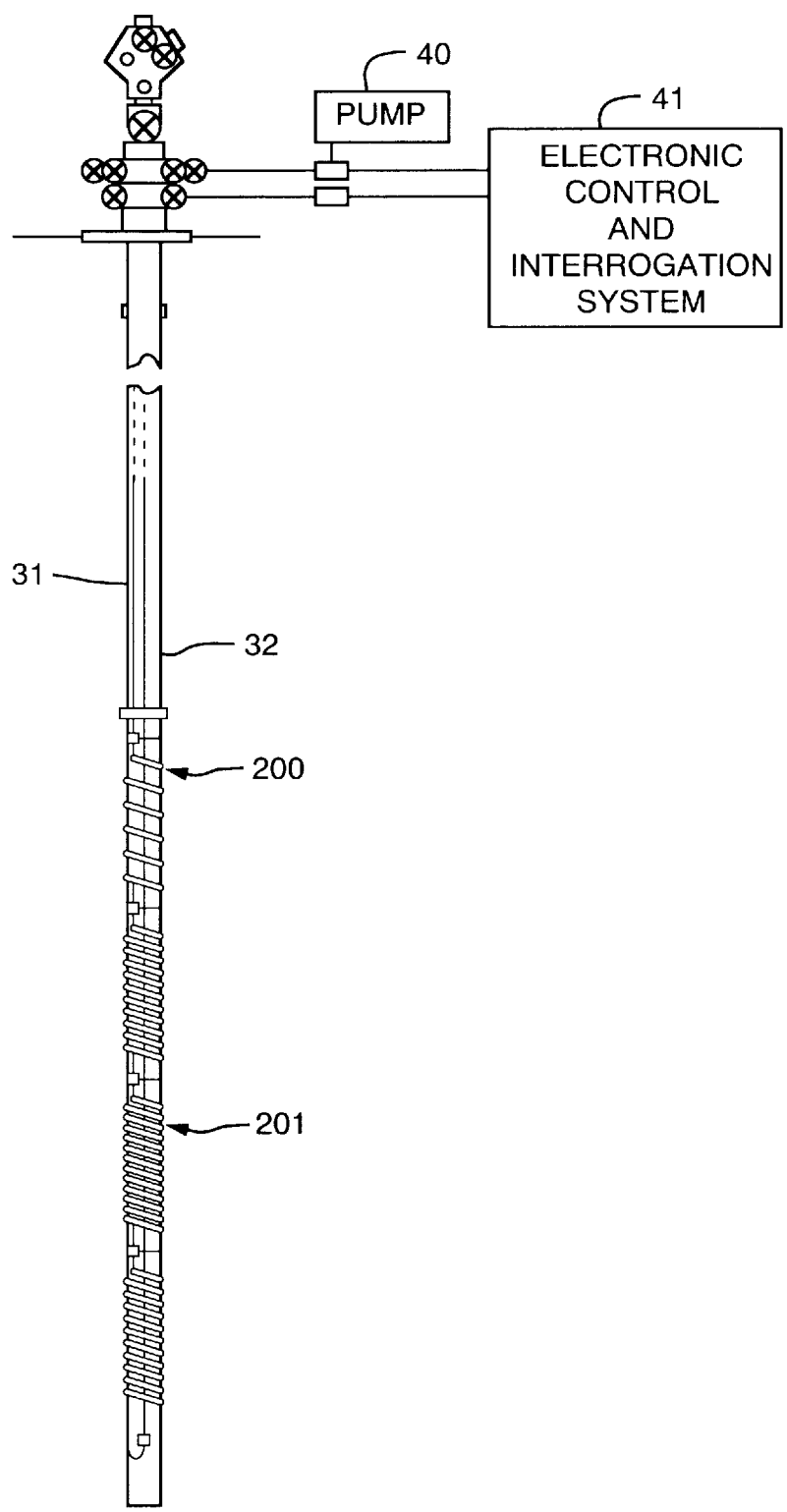
FIG. 5 is a diagram of an embodiment of the present invention configured as a temperature sensor.

An optical fibre can also be used as a temperature sensor as shown in FIG. 5. In this case the whole length of optical fibre in the control line would be a continuous temperature sensor. A pulse of light is launched into the fibre by the electronics contained in the electronic control and interrogation system 41. This interacts with the atoms, comprising the glass of the fibre along the whole of its length, and stimulates them to emit light with characteristics determined by the local temperature. Some of this light travels back along the fibre to the electronic control and interrogation system 41 where it is analysed to yield a continuous temperature profile for the whole length of the sensing fibre. Such an electronic control and interrogation system 41 is the York DTS 80. The resolution of such a sensor along the production tube can be increased by coiling the control line 31, which contains the temperature sensing fibre, more tightly around the production tube 32. Low resolution is achieved at point 200 where the control lines are widely spaced, whereas higher resolution is achieved at point 201 where the coils are more closely spaced.

For acoustic and seismic applications optical fibres can again be used as the sensors. In these cases a linear array of optical fibre hydrophones would be deployed by pumping it along the control line such that the effective centre of each sensor in the array is positioned in the coiled region of the control line. The directional sensitivity of the array would be adjusted electronically in the interrogation unit on the surface, in order to detect signals from the desired directions. Acoustic applications, which usually benefit from very high bandwidth but relatively low sensitivity, include, among others, sand detection, pump, monitoring and, fluid monitoring in the reservoir. Seismic arrays, on the other hand, need to be very sensitive but are usually narrow bandwidth. Optical fibre sensors can operate in both of the disparate regimes.

It is to be appreciated that the embodiments of the invention described above with reference to the accompanying drawings have been given by way of example only and that modifications and additional components may be provided to enhance the performance of the apparatus. Depending upon the use of the apparatus of the invention, the apparatus may be acoustic or seismic sensing apparatus, electric current sensing apparatus, or temperature profiling apparatus.

I claim:

1. Apparatus for the installation of sensors in channels, which apparatus comprises first channel means containing at least one sensor location means, the first channel means and the sensor location means being such that at least one sensor is able to be pumped through the first channel means to the sensor location means, the sensor location means being provided with at least one turn such that the physical disposition of the sensor after it has been pumped to the sensor location means is not linear, and the turn being such that it comprises a loop of hydraulic conduit.

2. Apparatus according to claim 1 in which the first channel means is a length of hydraulic conduit or chemical injection line.

3. Apparatus according to claim 1 in which the turn comprising the loop of hydraulic conduit is either in a plane or in a spiral.

4. Apparatus according to claim 1 in which the turn is wrapped around second channel means.

5. Apparatus according to claim 4 in which the second channel means is production tubing in an oil or gas well through which oil or gas is extracted from a reservoir.

6. Apparatus according to claim 4 in which there are several separate location means, each location means comprising several turns whose spacing is comparable to the diameter of the second channel means.

7. Apparatus according to claim 6 in which there are from 3–20 turns for each location means.

8. Apparatus according to claim 1 and including at least one sensor.

9. Apparatus according to claim 8 in which the sensors are in the form of an array of optical fibre acoustic sensors, and in which the array of optical fibre acoustic sensors is provided in the first channel means and located in the location means, with the effective centres of each sensor in the array positioned in a spiral around the location means.

10. Apparatus according to claim 8 in which the centre is a fibre optic current sensor.

* * * * *